United States Patent
Ogilvie

(10) Patent No.: US 8,205,390 B2
(45) Date of Patent: Jun. 26, 2012

(54) MECHANICALLY STIFFENED WEATHERSEAL CARRIER

(75) Inventor: Kenneth Stuart Ogilvie, Ann Arbor, MI (US)

(73) Assignee: Henniges Automotive Sealing Systems North America, Inc., Farmington Hills, MI (US)

( * ) Notice: Subject to any disclaimer, the term of this patent is extended or adjusted under 35 U.S.C. 154(b) by 496 days.

(21) Appl. No.: 12/393,618

(22) Filed: Feb. 26, 2009

(65) Prior Publication Data

US 2010/0212230 A1   Aug. 26, 2010

(51) Int. Cl.
E06B 7/16 (2006.01)

(52) U.S. Cl. ............... 49/490.1; 49/498.1; 49/475.1; 428/136; 428/122

(58) Field of Classification Search ............ 49/490.1, 49/498.1, 475; 428/136, 122
See application file for complete search history.

(56) References Cited

U.S. PATENT DOCUMENTS

| | | | | |
|---|---|---|---|---|
| 2,273,684 A | * | 2/1942 | Bailey ..................... | 49/490.1 |
| 3,208,119 A | * | 9/1965 | Seckerson ............... | 52/716.6 |
| 4,695,499 A | | 9/1987 | Whitener | |
| 4,749,203 A | | 6/1988 | Bright | |
| 4,791,014 A | * | 12/1988 | West ........................ | 428/43 |
| 5,302,466 A | * | 4/1994 | Davis et al. ............. | 428/573 |
| 5,741,573 A | * | 4/1998 | Malm ....................... | 428/83 |
| 5,783,312 A | | 7/1998 | Laughman et al. | |
| 5,871,682 A | | 2/1999 | Kii et al. | |
| 6,079,160 A | | 6/2000 | Bonds | |
| 6,548,143 B1 | * | 4/2003 | Heller ...................... | 428/122 |
| 6,742,255 B1 | * | 6/2004 | Frappier ................. | 29/888.3 |
| 6,854,240 B2 | * | 2/2005 | Mizuno et al. .......... | 52/716.5 |
| 7,257,924 B2 | * | 8/2007 | Kounobu et al. ........ | 49/490.1 |
| 2002/0050101 A1 | * | 5/2002 | Hayashi .................. | 49/490.1 |
| 2005/0144849 A1 | | 7/2005 | Boutin | |

FOREIGN PATENT DOCUMENTS

JP           55158844 A    * 12/1980

OTHER PUBLICATIONS

International Search Report, PCT/US2010/025516, Apr. 21, 2010, 2 pages.

* cited by examiner

Primary Examiner — Katherine W Mitchell
Assistant Examiner — Marcus Menezes
(74) Attorney, Agent, or Firm — Howard & Howard Attorneys PLLC

(57) ABSTRACT

A flange mounted weatherseal includes a carrier and a flexible cover covering the carrier. The carrier includes a base portion, a first side portion and a second side portion generally parallel to the first side portion and cooperating together with the first side portion and the base portion to define a generally U-shaped channel. The first side portion defines a plurality of first fingers, the second side portion defines a plurality of second fingers opposite the first fingers along a longitudinal axis, and the base portion defines a plurality of webs offset along the longitudinal axis relative to the first fingers and the second fingers. The first fingers, the second fingers and the webs each include deformations defining a non-planar cross sectional shape along the longitudinal axis to increase the rigidity of the carrier.

31 Claims, 5 Drawing Sheets

MECHANICALLY STIFFENED WEATHERSEAL CARRIER

BACKGROUND OF THE INVENTION

1. Field of the Invention

The subject invention generally relates to a flexible weatherseal for a vehicle, and more specifically to an elongated carrier for the weatherseal.

2. Description of the Prior Art

Weatherseals, utilized in vehicles, typically have a longitudinally extending channel shaped portion for gripping flange joints, such as those, which extend around openings in motor vehicles. The weatherseals typically include a channel shaped reinforcing carrier or core metal insert which is embedded within a flexible covering material. The flexible covering material may include, but is not limited to a plastic, a rubber, a polyurethane, or some other elastomer. The carrier must be sufficiently strong to properly grip the flange, yet be sufficiently flexible to allow the weatherseal to curve or bend to fit the contours of the flanges upon which the weatherseal is mounted.

There are many different types of carriers utilized in vehicular weatherseals. U.S. Pat. No. 6,079,160 discloses a weatherseal having a carrier that includes a continuous strip of metal, along the entire length of the weatherseal. The carrier disclosed in U.S. Pat. No. 6,079,160 includes a base portion, a first side portion extending outward from the base portion to a distal first edge and a second side portion spaced from the first side portion and extending outward from the base portion to a distal second edge. The first side portion, the second side portion and the base portion cooperating to define a generally U-shaped channel extending along the longitudinal axis. The first side portion defines a plurality of first slots extending transverse to the longitudinal axis. Each adjacent pair of the plurality of first slots cooperate to define a first finger therebetween. The second side portion defines a plurality of second slots extending transverse to the longitudinal axis. Each adjacent pair of the plurality of second slots cooperate to define a second finger therebetween. The first slots and the second slots extend from the first edge and the second edge respectively inward toward each other and at least partially overlap each other. The first side portion, the second side portion and the base portion each include a planar cross sectional shape along the longitudinal axis, i.e., the first side portion, the second side portion and the base portion are generally flat along the longitudinal axis.

The rigidity of the carrier, and thereby the weatherseal, such as the one disclosed in U.S. Pat. No. 6,079,160, is dependent upon the actual thickness of the metal utilized for the carrier. An increased rigidity requires an increased metal thickness. However, increasing the actual thickness of the metal utilized for the carrier increases the cost of the carrier, and thereby the weatherseal, and also increases the weight of the weatherseal, which is not desirable. Accordingly, there exists a need for a carrier design that increases rigidity without increasing the cost and weight of the carrier. Alternatively, there exists a need for a carrier that utilized less material, thereby reducing the weight and cost of the carrier, while maintaining a pre-determined rigidity level.

SUMMARY OF THE INVENTION AND ADVANTAGES

The subject invention provides a flexible weatherseal for a vehicle. The flexible weatherseal comprises a carrier, and a flexible cover covering the carrier. The carrier extends along a longitudinal axis. The carrier includes a base portion, a first side portion and a second side portion. The first side portion extends outward from the base portion to a distal first edge. The first side portion defines a plurality of first slots extending transverse to the longitudinal axis. Each adjacent pair of the plurality of first slots cooperate to define a first finger therebetween. The second side portion is spaced from the first side portion and extends outward from the base portion to a distal second edge. The second side portion defines a plurality of second slots extending transverse to the longitudinal axis. Each adjacent pair of the plurality of second slots cooperate to define a second finger therebetween. The base portion, the first side portion and the second side portion cooperate to define a generally U-shaped channel extending along the longitudinal axis. Each of the first fingers and each of the second fingers include a non-planar cross sectional shape along the longitudinal axis.

Accordingly, the carrier of the subject invention utilizes a non-planar cross sectional shape along the longitudinal axis for the first fingers and the second fingers. The non-planar cross sectional shape is more rigid than a planar, i.e., flat, cross sectional shape. The increased rigidity provided by the non-planar cross sectional shape of the first fingers and the second fingers permits the carrier to maintain the same rigidity against bending, while utilizing less material for the carrier, thereby reducing the weight and cost of the carrier. Alternatively, the overall rigidity of the carrier may be increased, while maintaining the current weight and cost of the prior art carriers.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

Referring to the Figures, wherein like numerals indicate corresponding parts throughout the several views, a flexible weatherseal is shown generally at 20.

Figure 1:
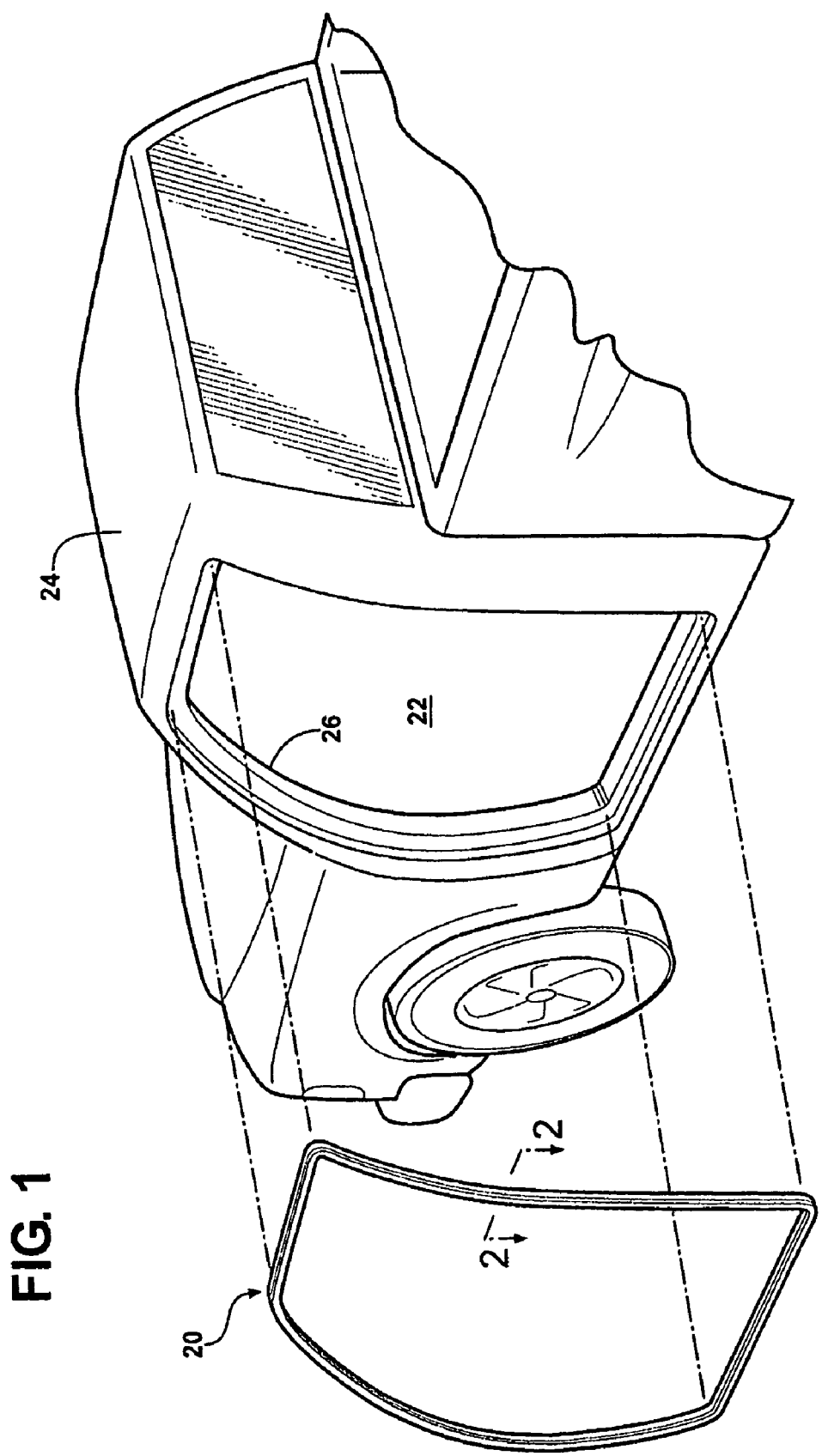
FIG. 1 is a partial exploded perspective view of a vehicle body panel defining a door opening and a weatherseal therefore.

Referring to FIG. 1, the weatherseal 20 is for a vehicle. More specifically, the weatherseal 20 is attached to a perimeter of an opening 22 defined by a body panel 24 of the vehicle, such as a door opening of the vehicle. The weatherseal 20 may be utilized for sealing trunk openings, door openings, sunroof openings, as well as utilized for glass run channels of the vehicle. It should be appreciated that the weatherseal 20 of the subject invention may be used for other purposes that are not specifically related to vehicles and are not described herein.

The weatherseal 20 is attached to a flange 26 of the body panel 24 that encircles the perimeter of the opening 22. The weatherseal 20 includes a sealing member 28 that engages a second panel (not shown) of the vehicle, such as a door panel. The sealing member 28 engages the second panel in sealing engagement to prevent moisture, debris and ambient exterior air from entering between the body panel 24 and the second panel as is well known in the art.

Figure 2:
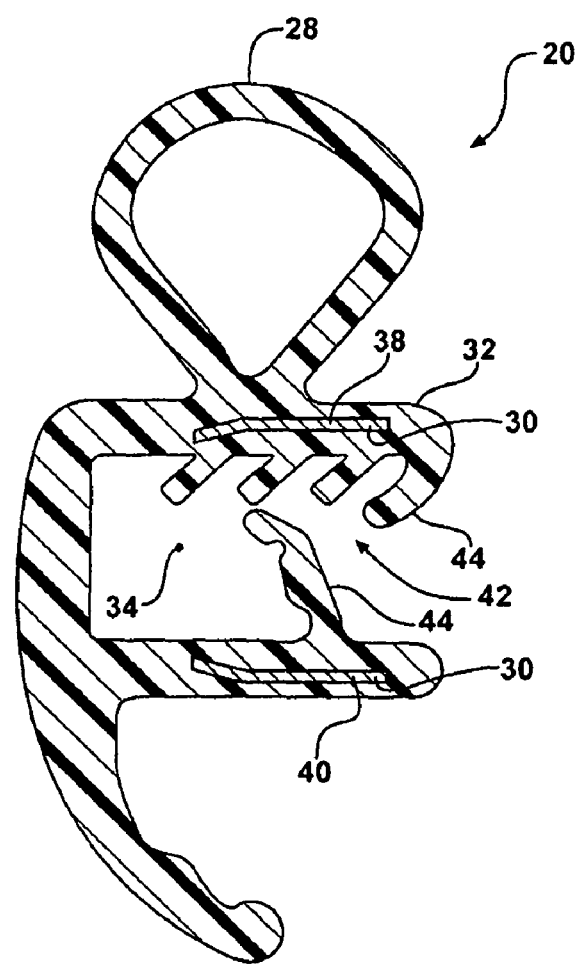
FIG. 2 is a cross sectional view of the weatherseal taken from lines 2-2 of FIG. 1.

Referring to FIG. 2, the weather seal includes a carrier 30 and a flexible cover 32 covering the carrier 30. The weatherseal 20, including both the carrier 30 and the flexible cover 32, extend along a longitudinal axis 34. The weatherseal 20 is manufactured in a generally linear configuration; however, the weatherseal 20 is flexible enough so that the weatherseal 20 may be bent into any suitable orientation or shape necessary to fit the opening 22 of the vehicle.

The sealing member 28 is attached to the flexible cover 32. Preferably, the flexible cover 32 includes and is integrally formed with the sealing member 28. The sealing member 28 extends outward away from the carrier 30, in a direction transverse to the longitudinal axis 34, i.e., the sealing member 28 extends in a generally perpendicular direction relative to the longitudinal axis 34. The sealing member 28 also extends the length of the weatherseal 20, along the longitudinal axis 34. Accordingly, when viewed in cross section perpendicular to the longitudinal axis 34, such as shown in FIG. 2, the sealing member 28 extends away from the carrier 30. However, it should be appreciated that the sealing member 28 also extends longitudinally along the carrier 30 so as to seal the entire length of the perimeter of the opening 22.

Preferably, the flexible cover 32 includes a polymeric material. The polymeric material may include a thermoplastic material or a thermosetting material, such as but not limited to a Thermoplastic Elastomer (TPE) including EPDM, or any combination thereof. Satisfactory thermoplastic and TPE materials include Permaprene™ by Metzeler Automotive Profile Systems; Sarlink® by DSM Thermoplastic Elastomers, Inc. of Massachusetts; Santoprene® by Advanced Elastomer Systems of Ohio and Uniprene® by Teknor Apex Company of Rhode Island. Suitable vulcanized or cross linked (thermosetting) polymeric materials include EPDM, EPDM modified with chloro butyl, and EPDM-SBR blends. It should be appreciated that the flexible material may also be manufactured from and include other materials not described herein capable of covering and protecting the carrier 30 from corrosion, while maintaining sufficient flexibility to permit bending of the carrier 30 into a desired shape to fit the opening 22.

Figure 3:
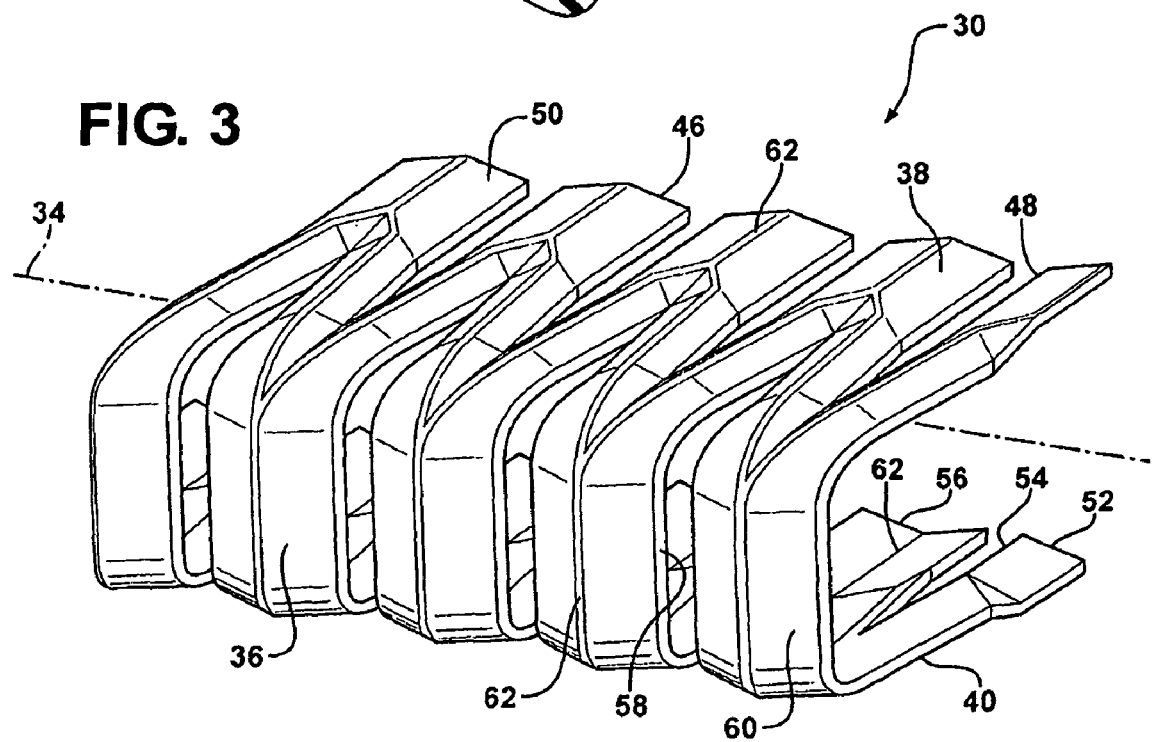
FIG. 3 is a fragmentary perspective view of a carrier of the weatherseal.

Referring also to FIG. 3, the carrier 30 includes a base portion 36, a first side portion 38 and a second side portion 40. The base portion 36, the first side portion 38 and the second side portion 40 all extend along the longitudinal axis 34. The first side portion 38 and the second side portion 40 are generally parallel to each other and in spaced relationship relative to each other. The first side portion 38 and the second side portion 40 are disposed on opposite sides of the base portion 36. Accordingly, the base portion 36, the first side portion 38 and the second side portion 40 cooperate to define a generally U-shaped channel extending along the longitudinal axis 34. The U-shaped channel is sized to tightly receive the flange 26 of the body panel 24 therein. Accordingly, it should be appreciated that the first side portion 38 and the second side portion 40 extend from the base portion 36 at a generally perpendicular angle relative to the base portion 36. However, it should be appreciated that the first side portion 38 and the second side portion 40 may extend from the base portion 36 at an angle less than ninety degrees, i.e., non-perpendicularly.

Preferably, the carrier 30 comprises and is manufactured from a metal. More preferably, the carrier 30 comprises and is manufactured from steel. The steel may include a coated steel, an electro-galvanized steel, a mild steel or a stainless steel. The metal may alternatively include an aluminum alloy. It should be appreciated that the carrier 30 may comprise and be manufactured from some other material not described herein, capable of providing the rigidity to grasp the flange 26 of the body panel 24 to retain the weatherseal 20 onto the body panel 24, while having sufficient flexibility to permit the weatherseal 20 to be bent into the desired shape of the opening 22.

The flexible cover 32 includes an attachment mechanism 42 for securing the weatherseal 20 to the flange 26 of the body panel 24. Preferably, the attachment mechanism 42 includes the flexible cover 32 having at least one ridge 44 disposed within and extending inward into the U-shaped channel defined by the carrier 30 for grasping the flange 26 of the vehicle. The at least one ridge 44 may include a plurality of ridges 44, extending inward into the U-shaped channel from one or both of the first side portion 38 and the second side portion 40. The ridge 44 may extend along the entire length of the weatherseal 20 along the longitudinal axis 34, or alternatively, the ridge 44 may include a plurality of ridges 44 spaced from each other a pre-determined distance along the length of the weatherseal 20. The at least one ridge 44 grasps the flange 26, and may optionally mechanically interlock with the flange 26, to prevent dislodgment of the weatherseal 20 from the flange 26.

Figure 4:
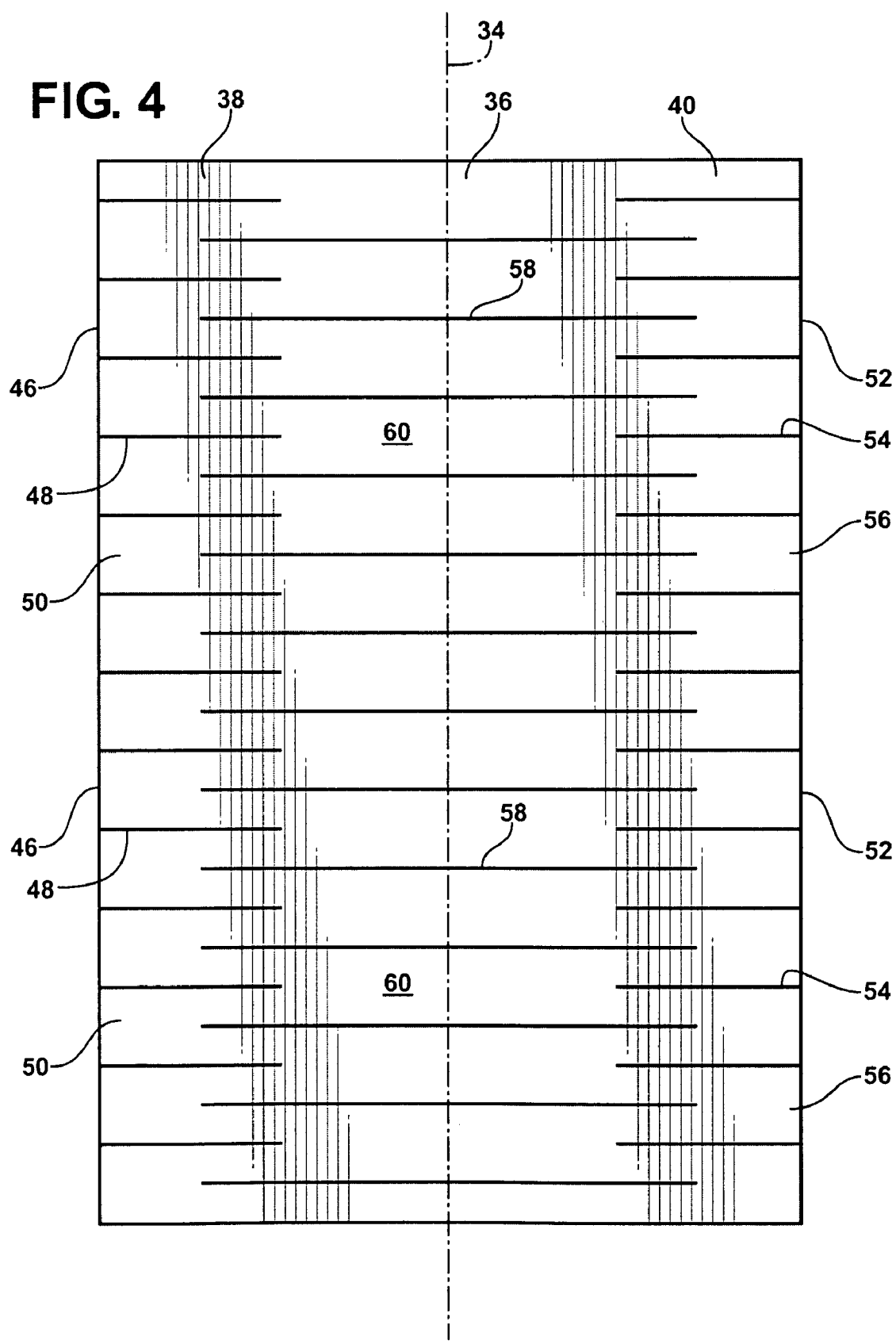
FIG. 4 is a plan view of the carrier in a first stage of manufacture.
Figure 5:
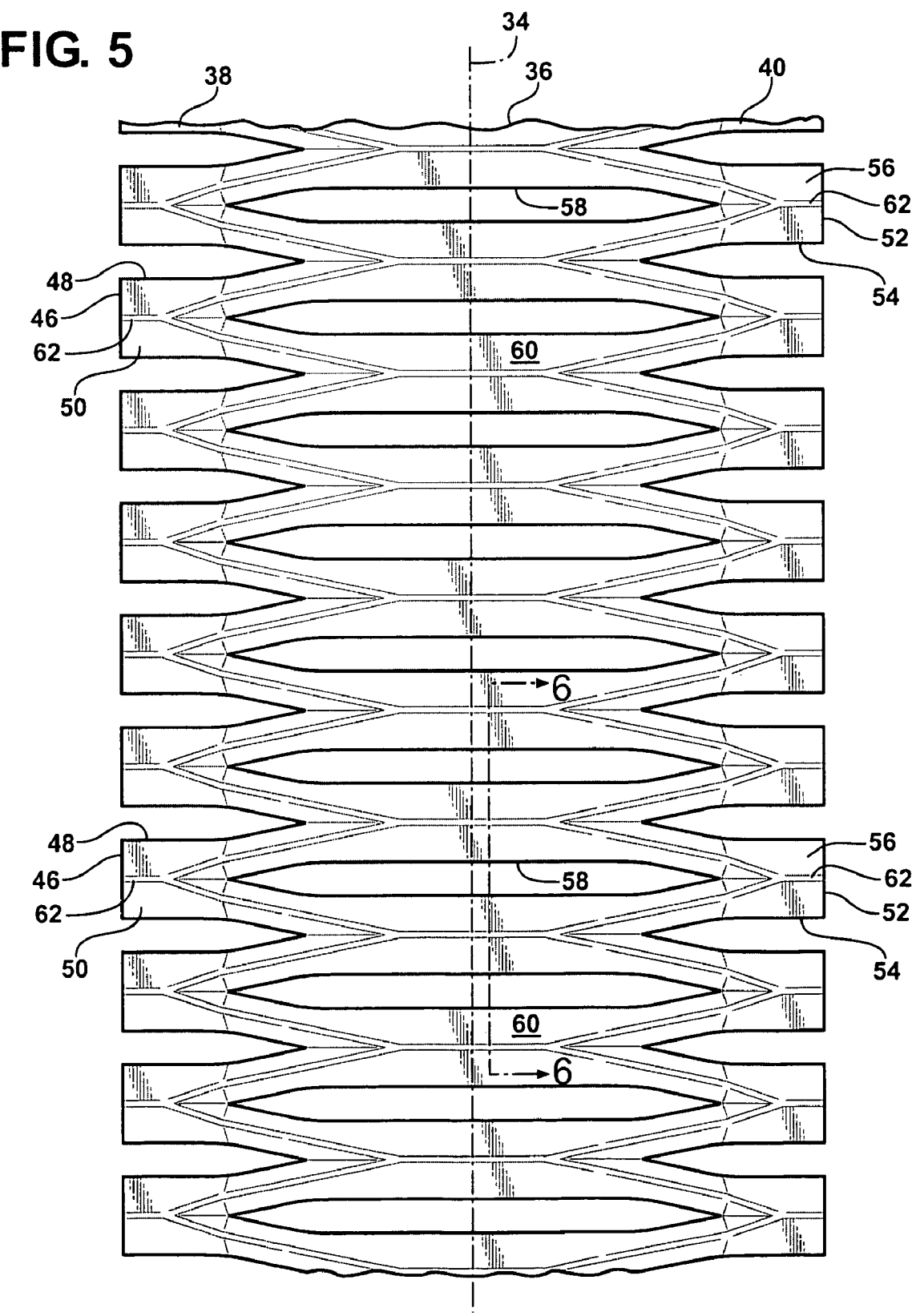
FIG. 5 is a plan view of the carrier in a second stage of manufacture.

Referring also to FIGS. 4 and 5, the first side portion 38 extends outward from the base portion 36 to a distal first edge 46. The first side portion 38 defines a plurality of first slots 48 extending transverse to the longitudinal axis 34. Each adjacent pair of the plurality of first slots 48 cooperate to define a first finger 50 therebetween. Accordingly, the first side portion 38 includes a plurality of first fingers 50. The plurality of first fingers 50 extend outward away from the base portion 36, generally perpendicular to the base portion 36 and the longitudinal axis 34.

The second side portion 40 extends outward from the base portion 36 to a distal second edge 52. The second side portion 40 defines a plurality of second slots 54 extending transverse to the longitudinal axis 34. Each adjacent pair of the plurality of second slots 54 cooperate to define a second finger 56 therebetween. Accordingly, the second side portion 40 includes a plurality of second fingers 56. The plurality of second fingers 56 extend outward away from the base portion 36, generally perpendicularly to the base portion 36 and the longitudinal axis 34.

The base portion 36 defines a plurality of base slots 58. The plurality of base slots 58 extend transverse to the longitudinal axis 34. Each adjacent pair of base slots 58 cooperate to define a web 60 therebetween. Accordingly, the base portion 36 includes a plurality of webs 60. Each of the plurality of webs 60 is generally parallel to each other, and transverse to the longitudinal axis 34. The first side portion 38 further includes a first connecting portion disposed between each of the webs 60 and each of the first fingers 50 for connecting the first fingers 50 to the webs 60. Likewise, the second side portion 40 includes a second connecting portion disposed between each of the webs 60 and each of the second fingers 56 for connecting the second fingers 56 to the webs 60.

Preferably, each of the first slots 48 is disposed opposite and opposes one of the second slots 54 along the longitudinal axis 34, i.e., the first slots 48 and the second slots 54 are evenly spaced opposite each other along the longitudinal axis 34. Accordingly, it should be appreciated that each of the first fingers 50 is disposed opposite and opposes one of the second fingers 56 along the longitudinal axis 34, i.e., the first fingers 50 and the second fingers 56 are evenly space opposite each other along the longitudinal axis 34. However, it should be appreciated that the first slots 48 and the second slots 54, and thereby the first fingers 50 and the second fingers 56, may be offset relative to each other along the longitudinal axis 34.

Each of the base slots 58 is disposed axially between adjacent pairs of the first slots 48 and adjacent pairs of the second slots 54. As such, the first slots 48 and the second slots 54 are staggered along the longitudinal axis 34 relative to the base slots 58. Each of the base slots 58 is axially centered relative to each opposing pair of the first slots 48 and the second slots 54 along the longitudinal axis 34. Accordingly, each of the base slots 58 is transversely centered about the longitudinal axis 34, i.e., the longitudinal axis 34 bisects each of the base slots 58 at a center of the base slots 58.

The first slots 48 overlap with the base slots 58 in a direction transverse to the longitudinal axis 34. Similarly, the second slots 54 overlap with the base slots 58 in a direction transverse to the longitudinal axis 34. Accordingly, the first slots 48 and the second slots 54 extend inward from the distal first edge 46 and the distal second edge 52 a distance sufficient to overlap, or extend past, a portion of the base slots 58.

In manufacture, the carrier 30 is preferably formed from a single planar sheet of material. Referring to FIG. 4, the plurality of first slots 48, the plurality of second slots 54 and the plurality of base slots 58 are cut into or otherwise formed into the sheet of material. Referring to FIG. 5, the sheet of material is then stretched to lengthen the sheet of material along the longitudinal axis 34. As a result of the stretching process, the first slots 48, the second slots 54 and the base slots 58 are all expanded. It should be appreciated that the first slots 48 and the second slots 54 must overlap with the base slots 58, and that the base slots 58 must alternate with both the first slots 48 and the second slots 54 along the longitudinal axis 34, to permit the stretching of the sheet of material without significantly thinning the material.

Figure 6:
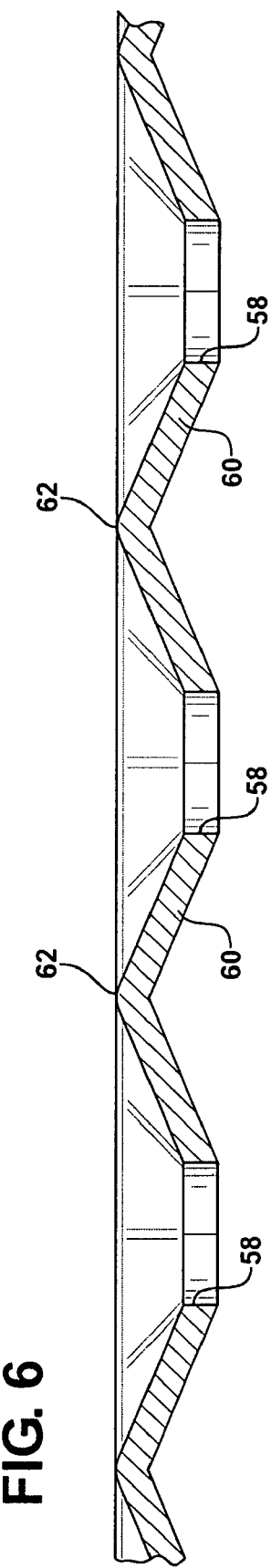
FIG. 6 is an enlarged fragmentary cross sectional view along a longitudinal axis of the carrier taken from lines 6-6 of FIG. 5.

Referring to FIGS. 5 and 6, each of the first fingers 50 and each of the second fingers 56 include a non-planar cross sectional shape along the longitudinal axis 34, i.e., parallel to the longitudinal axis 34. Similarly, each of the webs 60 include a non-planar cross sectional shape along the longitudinal axis 34, i.e., parallel to the longitudinal axis 34. The non-planar cross sectional shape of each of the first fingers 50, each of the second fingers 56 and each of the webs 60 include a deformation 62 extending transverse to the longitudinal axis 34 and extending away from a plane parallel to the first side portion 38, the second side portion 40 and the base portion 36 respectively. The deformation 62 defines the non-planar shape of each of the first fingers 50, each of the second fingers 56 and each of the webs 60 respectively.

As best shown in FIG. 5, the deformation 62 in each of the webs 60 is continuous with the deformation 62 in at least one of the first fingers 50 and at least one of the second fingers 56. Accordingly, the deformations 62 preferably extend from or near one of the distal first edge 46 and the second distal edge, across a width of the carrier 30 to or near the other of the distal first edge 46 or the distal second edge 52. However, it should be appreciated that the deformations 62 need not extend across the width of the carrier 30, and may be intermittingly or strategically spaced throughout the carrier 30. Furthermore, the deformations 62 may be extend outward away from the plane of the sheet of material from either one or both of the primary surfaces of the sheet of material, i.e., the deformations 62 may extend from one or both of a top surface and a bottom surface of the sheet of material utilized to form the carrier 30.

Referring back to FIGS. 5 and 6, the deformation 62 of each of the first fingers 50, each of the second fingers 56 and each of the webs 60 increase an apparent thickness of the sheet of material utilized to form the carrier 30. The sheet of material utilized to form the carrier 30 includes an actual material thickness, i.e., the thickness of the material along the plane of the material. The deformations 62 bend the sheet of material out of an original planar shape to increase the apparent thickness of the sheet of material, thereby increasing the rigidity of the sheet of material.

Figure 7:
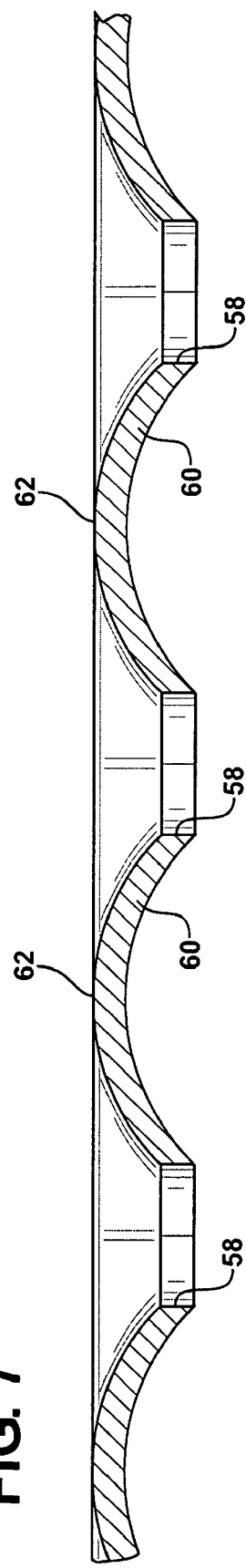
FIG. 7 is an enlarged fragmentary cross sectional view along the longitudinal axis of an alternative embodiment of the carrier.

As shown in FIGS. 5 and 6, the deformation 62 on each of the first fingers 50, each of the second fingers 56 and each of the webs 60 includes an apex to define a generally V-shaped cross sectional shape along the longitudinal axis 34. Referring to FIG. 7, an alternative embodiment of the deformations 62 is shown, wherein the deformation 62 of each of the first fingers 50, each of the second fingers 56 and each of the webs 60 includes a radius to define a generally arcuate cross sectional shape along the longitudinal axis 34. It should be appreciated that the cross sectional shape of the deformations 62 may include other cross sectional shapes not shown or described herein.

Referring back to FIGS. 4 and 5, the deformations 62 are preferably formed into the sheet of material simultaneously with the formation of the first slots 48, the second slots 54 and the base slots 58. After the sheet of material is stretched to open the first slots 48, the second slots 54 and the base slots 58, the sheet of material is bent into the generally U-shaped channel, thereby defining the first side portion 38, the second side portion 40 and the base portion 36. It should be appreciated that the carrier 30 may be formed in some other manner not describe herein.

Preferably, the flexible cover 32 is extruded over the carrier 30. The flexible cover 32 may be extruded over the carrier 30 prior to the carrier 30 being formed into the U-shaped channel or after the carrier 30 is formed into the U-shaped channel. It should be appreciated that the flexible cover 32 may be formed onto the carrier 30 in some other manner not described herein.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An elongated carrier for reinforcing a resilient weatherseal, said carrier comprising:

a base portion extending along a longitudinal axis;

a first side portion extending outward from said base portion to a distal first edge and defining a plurality of first slots extending transverse to said longitudinal axis with each adjacent pair of said plurality of first slots cooperating to define a first finger therebetween with said first finger further defined as a plurality of first fingers disposed between respective pairs of first slots;

a second side portion spaced from said first side portion and extending outward from said base portion to a distal second edge and defining a plurality of second slots extending transverse to said longitudinal axis with each adjacent pair of said plurality of second slots cooperating to define a second finger therebetween with said second finger further defined as a plurality of second fingers disposed between respective pairs of second slots;

said base portion, said first side portion and said second side portion cooperating to define a generally U-shaped channel extending along said longitudinal axis;

said base portion defines a plurality of base slots extending transverse to said longitudinal axis with each adjacent pair of base slots cooperating to define a web therebetween with said web further defined as a plurality of webs disposed between respective pairs of base slots;

said first side portion includes a first connecting portion disposed between adjacent webs and adjacent first fingers for connecting said first fingers to said webs with said first connecting portion further disposed between adjacent base slots and adjacent first slots along said longitudinal axis with said first connecting portion further defined as a plurality of first connecting portions disposed between respective webs and first fingers;

said second side portion includes a second connecting portion disposed between adjacent webs and adjacent second fingers for connecting said second fingers to said webs with said second connecting portion further disposed between adjacent base slots and adjacent second slots along said longitudinal axis with said second connecting portion further defined as a plurality of second connecting portions disposed between respective webs and second fingers; and each of said first fingers, each of said second fingers, each of said webs, each of said first connecting portions, and each of said second connecting portions include a non-planar cross sectional shape along said longitudinal axis; each of said first fingers, each of said second fingers, each of said first connecting portions, each of said second connecting portions, and each of said webs include a deformation extending transverse to said longitudinal axis such that said deformation of said first fingers and said first connecting portions extend away from a plane parallel to said first side portion, said deformation of said second fingers and said second connecting portions extend away from a plane parallel to said second side portion, and said deformation of said webs extend away from a plane parallel to said base portion to define said non-planar shape of each of said first fingers, each of said second fingers, each of said first connecting portions, each of said second connecting portions, and each of said webs; said deformation of said first fingers, said second fingers, said first connecting portions, said second connecting portions, and said webs are interconnected and continuous with each other.

2. A carrier as set forth in claim 1 wherein said deformation of each of said first fingers, each of said second fingers and each of said webs includes an apex to define a generally V-shaped cross sectional shape along said longitudinal axis.

3. A carrier as set forth in claim 2 wherein said apexes of said webs, said first and second fingers, and said first and second connecting portions are interconnected and continuous with each other and a pair of planar deformations extend from said apexes to further define said V-shaped cross sectional shape.

4. A carrier as set forth in claim 1 wherein said deformation of each of said first fingers, each of said second fingers and each of said webs includes a radius to define a generally arcuate cross sectional shape along said longitudinal axis.

5. A carrier as set forth in claim 1 wherein each of said first slots is disposed opposite one of said second slots along said longitudinal axis.

6. A carrier as set forth in claim 5 wherein each of said base slots is disposed axially between adjacent pairs of said first slots and adjacent pairs of said second slots.

7. A carrier as set forth in claim 6 wherein each of said base slots are axially centered relative to each opposing pair of said first slots and said second slots along said longitudinal axis.

8. A carrier as set forth in claim 1 wherein said first slots overlap with said base slots in a direction transverse to said longitudinal axis and wherein said second slots overlap with said base slots in a direction transverse to said longitudinal axis.

9. A carrier as set forth in claim 1 wherein said deformation of said webs, said deformation of said first and second fingers, and said deformation of said first and second connecting portions each define an apex interconnected and continuous with each other.

10. A carrier as set forth in claim 9 wherein said apex of said first fingers split into a pair of said apexes along a respective pair of said first connecting portions and wherein one of said pair of said apexes merge into said apex of one of said webs and another one of said pair of said apexes merge into said apex of another one of said webs.

11. A carrier as set forth in claim 9 wherein said apex of said second fingers split into a pair of said apexes along a respective pair of said second connecting portions and wherein one of said pair of said apexes merge into said apex of one of said webs and another one of said pair of said apexes merge into said apex of another one of said webs.

12. A carrier as set forth in claim 1 wherein each of said first connecting portions extend angularly transverse to said longitudinal axis between respective first fingers and respective webs such that each of said first fingers are connected to a pair of said first connecting portions.

13. A carrier as set forth in claim 12 wherein said non-planar cross sectional shape of each of said first fingers are interconnected and continuous with said non-planar cross sectional shape of said pair of said first connecting portions.

14. A carrier as set forth in claim 13 wherein said non-planar cross sectional shape of one of said pair of said first connecting portions is interconnected and continuous with said non-planar cross sectional shape of one of said webs and said non-planar cross sectional shape of an other one of said pair of said first connecting portions is interconnected and continuous with said non-planar cross sectional shape of an other one of said webs.

15. A carrier as set forth in claim 1 wherein each of said second connecting portions extend angularly transverse to said longitudinal axis between respective second fingers and respective webs such that each of said second fingers are connected to a pair of said second connecting portions.

16. A carrier as set forth in claim 15 wherein said non-planar cross sectional shape of each of said second fingers are interconnected and continuous with said non-planar cross sectional shape of said pair of said second connecting portions.

17. A flexible weatherseal for a vehicle, said weatherseal comprising:
    a carrier extending along a longitudinal axis; and
    a flexible cover covering said carrier;
    said carrier including:
        a base portion;

a first side portion extending outward from said base portion to a distal first edge and defining a plurality of first slots extending transverse to said longitudinal axis with each adjacent pair of said plurality of first slots cooperating to define a first finger therebetween with said first finger further defined as a plurality of first fingers disposed between respective pairs of first slots;

a second side portion spaced from said first side portion and extending outward from said base portion to a distal second edge and defining a plurality of second slots extending transverse to said longitudinal axis with each adjacent pair of said plurality of second slots cooperating to define a second finger therebetween with said second finger further defined as a plurality of second fingers disposed between respective pairs of second slots;

said base portion, said first side portion and said second side portion cooperating to define a generally U-shaped channel extending along said longitudinal axis;

said base portion defines a plurality of base slots extending transverse to said longitudinal axis with each adjacent pair of base slots cooperating to define a web therebetween with said web further defined as a plurality of webs disposed between respective pairs of base slots;

said first side portion includes a first connecting portion disposed between adjacent webs and adjacent first fingers for connecting said first fingers to said webs with said first connecting portion further disposed between adjacent base slots and adjacent first slots along said longitudinal axis with said first connecting portion further defined as a plurality of first connecting portions disposed between respective webs and first fingers;

said second side portion includes a second connecting portion disposed between adjacent webs and adjacent second fingers for connecting said second fingers to said webs with said second connecting portion further disposed between adjacent base slots and adjacent second slots along said longitudinal axis with said second connecting portion further defined as a plurality of second connecting portions disposed between respective webs and second fingers; and each of said first fingers, each of said second fingers, each of said webs, each of said first connecting portions, and each of said second connecting portions include a non-planar cross sectional shape along said longitudinal axis; each of said first fingers, each of said second fingers, each of said first connecting portions, each of said second connecting portions, and each of said webs include a deformation extending transverse to said longitudinal axis such that said deformation of said first fingers and said first connecting portions extend away from a plane parallel to said first side portion, said deformation of said second fingers and said second connecting portions extend away from a plane parallel to said second side portion, and said deformation of said webs extend away from a plane parallel to said base portion to define said non-planar shape of each of said first fingers, each of said second fingers, each of said first connecting portions, each of said second connecting portions, and each of said webs; said deformation of said first fingers, said second fingers, said first connecting portions, said second connecting portions, and said webs are interconnected and continuous with each other.

18. A weatherseal as set forth in claim 17 wherein said flexible cover includes a sealing member extending outward away from said carrier transverse to said longitudinal axis and extending along said longitudinal axis.

19. A weatherseal as set forth in claim 18 wherein said flexible cover includes at least one ridge disposed within and extending inward into said U-shaped channel for grasping a flange of the vehicle.

20. A weatherseal as set forth in claim 19 wherein said flexible cover includes a polymeric material.

21. A carrier as set forth in claim 17 wherein said deformation in each of said first fingers, each of said second fingers and each of said webs includes an apex to define a generally V-shaped cross sectional shape along said longitudinal axis.

22. A carrier as set forth in claim 21 wherein said apexes of said webs, said first and second fingers, and said first and second connecting portions are interconnected and continuous with each other and a pair of planar deformations extend from said apexes to further define said V-shaped cross sectional shape.

23. A carrier as set forth in claim 17 wherein said deformation in each of said first fingers, each of said second fingers and each of said webs includes a radius to define a generally arcuate cross sectional shape along said longitudinal axis.

24. A carrier as set forth in claim 17 wherein said deformation of said webs, said deformation of said first and second fingers, and said deformation of said first and second connecting portions each define an apex interconnected and continuous with each other.

25. A carrier as set forth in claim 24 wherein said apex of said first fingers split into a pair of said apexes along a respective pair of said first connecting portions and wherein one of said pair of said apexes merge into said apex of one of said webs and another one of said pair of said apexes merge into said apex of another one of said webs.

26. A carrier as set forth in claim 24 wherein said apex of said second fingers split into a pair of said apexes along a respective pair of said second connecting portions and wherein one of said pair of said apexes merge into said apex of one of said webs and another one of said pair of said apexes merge into said apex of another one of said webs.

27. An elongated carrier for reinforcing a resilient weatherseal, said carrier comprising:

a base portion extending along a longitudinal axis with said base portion defining a plurality of base slots extending transverse to said longitudinal axis with each adjacent pair of base slots cooperating to define a web therebetween with each of said webs having a non-planar cross sectional shape along said longitudinal axis to define a web apex;

a first side portion extending outward from said base portion to a distal first edge and defining a plurality of first slots extending transverse to said longitudinal axis with each adjacent pair of said plurality of first slots cooperating to define a first finger therebetween with each of said first fingers having a non-planar cross sectional shape along said longitudinal axis to define a first finger apex;

a second side portion spaced from said first side portion and extending outward from said base portion to a distal second edge and defining a plurality of second slots extending transverse to said longitudinal axis with each adjacent pair of said plurality of second slots cooperating to define a second finger therebetween with each of said second fingers having a non-planar cross sectional shape along said longitudinal axis to define a second finger apex;

said base portion, said first side portion and said second side portion cooperating to define a generally U-shaped channel extending along said longitudinal axis;

said first side portion includes a first connecting portion disposed between each of said webs and each of said first fingers for connecting said first fingers to said webs with said first connecting portion further disposed between each of said base slots and each of said first slots along said longitudinal axis with each of said first connecting portions having a non-planar cross sectional shape along said longitudinal axis to define a first connecting portion apex;

said second side portion includes a second connecting portion disposed between each of said webs and each of said second fingers for connecting said second fingers to said webs with said second connecting portion further disposed between each of said base slots and each of said second slots along said longitudinal axis with each of said second connecting portions having a non-planar cross sectional shape along said longitudinal axis to define a second connecting portion apex; and said first finger apexes, said second finger apexes, said web apexes, said first connecting portion apexes, and said second connecting portion apexes being interconnected and continuous with each other.

28. A carrier as set forth in claim 27 wherein each of said first finger apexes split into a pair of said first finger apexes with one of said pair of said first finger apexes merging into a first connecting portion apex and said first connecting portion apex merging with one of said web apexes.

29. A carrier as set forth in claim 27 wherein a pair of planar deformations extend from said apexes to define a V-shaped cross sectional shape.

30. A carrier as set forth in claim 27 wherein each of said first and second connecting portions include a deformation extending from said first and second connecting portion apexes, respectively, transverse to said longitudinal axis and away from a plane parallel to said first side portion and said second side portion, respectively, to define said non-planar shape of each of said first and second connecting portions, respectively.

31. A carrier as set forth in claim 27 wherein each of said first connecting portions extend angularly relative to said longitudinal axis between each of said first fingers and each of said webs such that each of said first fingers are connected to a pair of said first connecting portions.

* * * * *